(12) United States Patent
Cheng et al.

(10) Patent No.: US 11,983,041 B2
(45) Date of Patent: May 14, 2024

(54) FLEXIBLE DISPLAY

(71) Applicants: Yu-Wen Cheng, Taipei (TW); Yan-Yu Chen, Taipei (TW); Chun-Wen Wang, Taipei (TW); Chung-Lin Hsieh, Taipei (TW)

(72) Inventors: Yu-Wen Cheng, Taipei (TW); Yan-Yu Chen, Taipei (TW); Chun-Wen Wang, Taipei (TW); Chung-Lin Hsieh, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 309 days.

(21) Appl. No.: 17/506,690

(22) Filed: Oct. 21, 2021

(65) Prior Publication Data
US 2022/0147103 A1 May 12, 2022

(30) Foreign Application Priority Data

Nov. 10, 2020 (TW) .................................. 109139118

(51) Int. Cl.
*H05K 1/18* (2006.01)
*G06F 1/16* (2006.01)

(52) U.S. Cl.
CPC .......... *G06F 1/1652* (2013.01); *G06F 1/1681* (2013.01)

(58) Field of Classification Search
CPC ............................ G06F 1/1652; G06F 1/1681
USPC ....................................................... 361/749
See application file for complete search history.

(56) References Cited

U.S. PATENT DOCUMENTS

| 9,307,658 B2 * | 4/2016 | Song ..................... G06F 1/1601 |
| 2014/0198465 A1 * | 7/2014 | Park .......................... G09F 9/00 |
| | | 361/749 |

FOREIGN PATENT DOCUMENTS

| CN | 109804330 | 5/2019 |
| TW | I536334 | 6/2016 |
| TW | I578290 | 4/2017 |

OTHER PUBLICATIONS

"Office Action of China Counterpart Application", dated Aug. 29, 2023, p. 1-p. 12.

* cited by examiner

*Primary Examiner* — Binh B Tran
(74) *Attorney, Agent, or Firm* — JCIPRNET (57) ABSTRACT

A flexible display, including a stand, a supporting mechanism, a flexible screen, a driving component, a driven component, and a link, is provided. The supporting mechanism is connected to the stand. The flexible screen is attached to the supporting mechanism. The driving component is disposed on the stand. The driven component is disposed on a side of the supporting mechanism distant from the stand. The link has a first end and a second end opposite to the first end. The first end is connected to the driving component, and the second end is connected to the driven component. The driving component drives the driven component through the link to move on a first horizontal plane to drive the supporting mechanism and the flexible screen to transform when the driving component moves between the first horizontal plane and a second horizontal plane that is parallel to the first horizontal plane.

13 Claims, 6 Drawing Sheets

FLEXIBLE DISPLAY

CROSS-REFERENCE TO RELATED APPLICATION

This application claims the priority benefit of Taiwan application serial no. 109139118, filed on Nov. 10, 2020. The entirety of the abovementioned patent application is hereby incorporated by reference herein and made a part of this specification.

BACKGROUND

Technical Field

This disclosure relates to a display, and in particular to a flexible display.

Description of Related Art

With the development of display technology, the demand for curved displays and flexible displays has been increasing, and applications have become more extensive. In general, a curved screen of a curved display is mostly set to be of a fixed curvature, therefore making it more difficult to drastically bend the curved screen. On the other hand, the flexible displays commonly seen are roughly divided into an inward folding design and an outward folding design, and their flexible screens are roughly divided into two side wing parts and a bent part located between the two side wings parts. During a bending process of the flexible screen, the wing parts on the two sides are always in a flat state, and only the bent part generates actions such as bending or flattening, to enable the flexible display to open and close by 180 degrees. Therefore, the flexible displays commonly seen cannot meet the requirements of universal folding. In addition, the folding of the flexible displays commonly seen is mostly done manually, therefore operational convenience is not satisfactory.

SUMMARY

This disclosure provides a flexible display, which can meet the requirements of universal bending.

The disclosure provides a flexible display, which includes a stand, a supporting mechanism, a flexible screen, a driving component, a driven component, and a link. The supporting mechanism is connected to the stand. The flexible screen is attached to the supporting mechanism. The driving component is disposed on the stand, and configured for moving between a first horizontal plane and a second horizontal plane that is parallel to the first horizontal plane. The driven component is disposed on a side of the supporting mechanism distant from the stand. The link has a first end and a second end opposite to the first end. The first end is connected to the driving component, and the second end is connected to the driven component. The driving component drives the driven component through the link to move on the first horizontal plane to drive the supporting mechanism and the flexible screen to transform when the driving component moves between the first horizontal plane and the second horizontal plane.

In an embodiment of the disclosure, there is a height difference between the first horizontal plane and the second horizontal plane, and a moving direction of the driving component is perpendicular to the first horizontal plane.

In an embodiment of the disclosure, the supporting mechanism includes at least one first hinge block, multiple second hinge blocks rotatably connected to each other, at least one third hinge block, at least one first supporting rod, multiple second supporting rod, and at least one third supporting rod. The first hinge block is rotatably connected to the stand. The first hinge block is located between the stand and the multiple second hinge blocks, and one of the second hinge blocks is rotatably connected to the first hinge block. The multiple second hinge blocks are located between the first hinge block and the third hinge block, and the third hinge block is rotatably connected to another of the second hinge blocks. The first supporting rod is slidably disposed on the first hinge block. The multiple second supporting rods are fixed on the multiple second hinge blocks. The third supporting rod is slidably disposed on the third hinge block. The flexible screen is attached to the first supporting rod, the multiple second supporting rods, and the third supporting rod. The driven component is disposed on an end of the third hinge block distant from the stand.

In an embodiment of the disclosure, the first hinge block, the multiple second hinge blocks, and the third hinge block fit to form a concave arc structure, and the flexible screen coordinates with the concave arc structure to form a curved screen.

In an embodiment of the disclosure, the first hinge block fit to form a first flat structure, the multiple second hinge blocks fit to form the convex arc structure, and the third hinge block is fit to form a second flat structure. The flexible screen coordinates with the first flat structure, the convex arc structure, and the second flat structure to form a first flat screen section, a curved screen section, and a second flat screen section.

In an embodiment of the disclosure, the supporting mechanism further includes a spring, and two ends of the spring are respectively connected to the third hinge block and the third supporting rod.

In an embodiment of the disclosure, the number of the first hinge block is more than one, and the number of the third hinge block is more than one. The multiple first hinge blocks are rotatably connected to each other, one of the first hinge blocks is rotatably connected to the stand, and another of the first hinge blocks is rotatably connected to one of the second hinge blocks. The multiple third hinge blocks are rotatably connected to each other, one of the third hinge blocks is rotatably connected to another of the second hinge blocks, and the driven component is disposed on one of the multiple third hinge blocks distant from the stand.

In an embodiment of the disclosure, the number of the first supporting rods is more than one, and the number of the third supporting rods is more than one. The multiple first supporting rods are slidably disposed on the multiple first hinge blocks, and the multiple third supporting rods are slidably disposed on the multiple third hinge blocks.

In an embodiment of the disclosure, the supporting mechanism further includes the spring, and two ends of the spring are respectively connected to the one of the multiple third hinge blocks distant from the stand and the third supporting rod disposed on the one of the multiple third hinge blocks distant from the stand.

In an embodiment of the disclosure, the flexible display further includes a sliding rod disposed on the stand. The driving component includes a driving sleeve and a driving pivoting base connected to the driving sleeve. The driving sleeve is slidably sleeved on the sliding rod, and the first end of the link is pivotally connected to the driving pivoting base.

In an embodiment of the disclosure, the flexible display further includes a guiding component disposed on the stand and abutting against the sliding rod. The guiding component has a spiral sliding rail, and the driving sleeve is mechanically coupled to the spiral sliding rail.

In an embodiment of the disclosure, the flexible display further includes a motor disposed on the stand and a belt mechanically coupled to the motor. The belt is mechanically coupled to the driving sleeve, and a transmission direction of the belt is parallel to the sliding rod.

In an embodiment of the disclosure, the driven component includes a driven pivot and a driven pivoting base, and the driven pivot is disposed on the side of the supporting mechanism distant from the stand. The driven pivoting base is pivotally connected to the driven pivot, and the second end of the link is pivotally connected to the driven pivoting base.

Based on the above, in the flexible display of the disclosure, the driven component is driven by the link and moves on the same horizontal plane by the reciprocating movement of the driving component between the two different horizontal planes, so as to drive the supporting mechanism and the flexible screen attached on the supporting mechanism to transform correspondingly. In one mode, the flexible screen forms the curved screen to provide a single-sided display and surround view. In another mode, the flexible screen forms the first flat screen section, the curved screen section, and the second flat screen section to provide at least three different orientations of visualization. In other words, the flexible display of the disclosure can meet the requirements of universal bending.

To make the aforementioned more comprehensible, several embodiments accompanied by drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
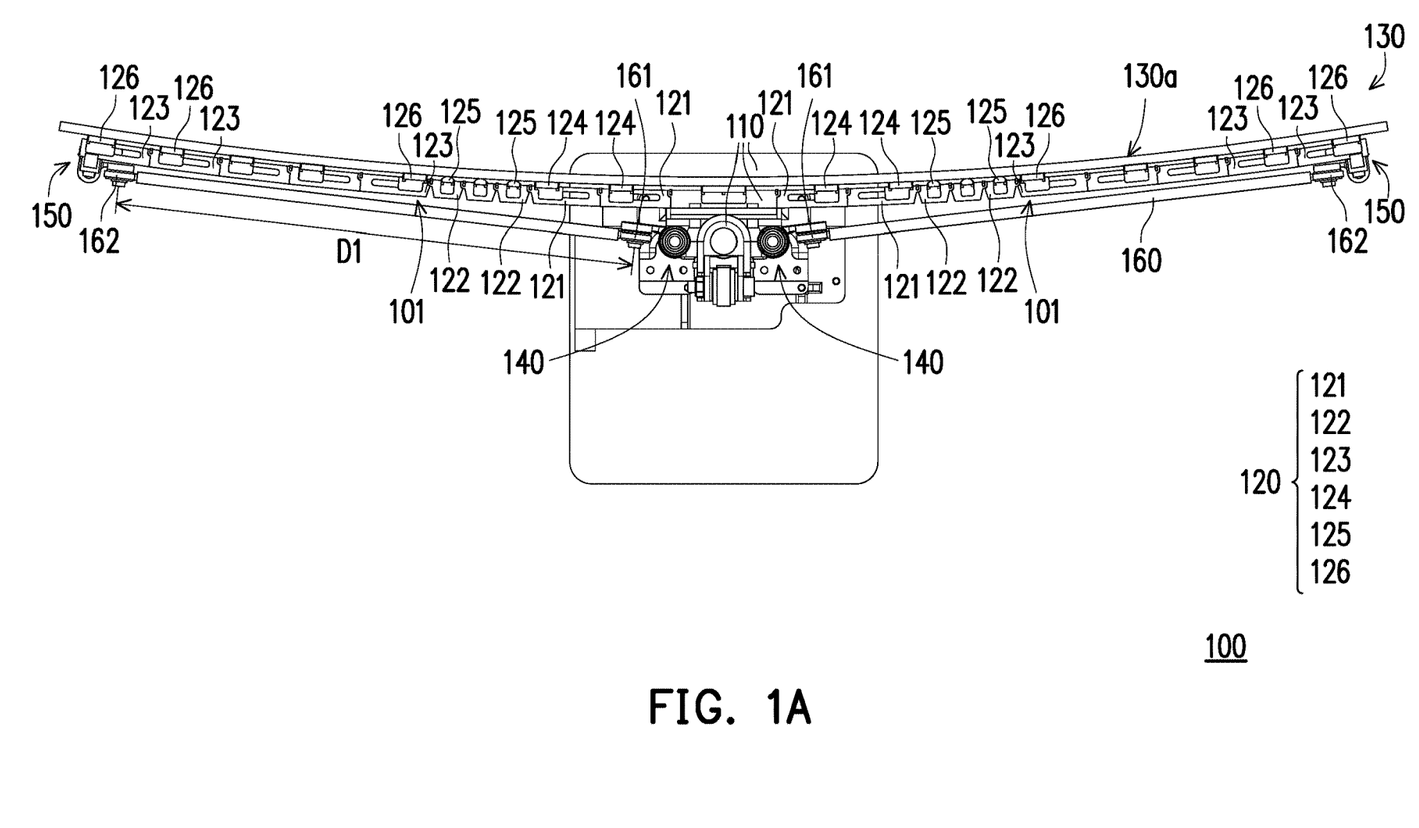
FIG. 1A is a schematic top view of a flexible display in a first mode according to an embodiment of the disclosure.
Figure 1B:
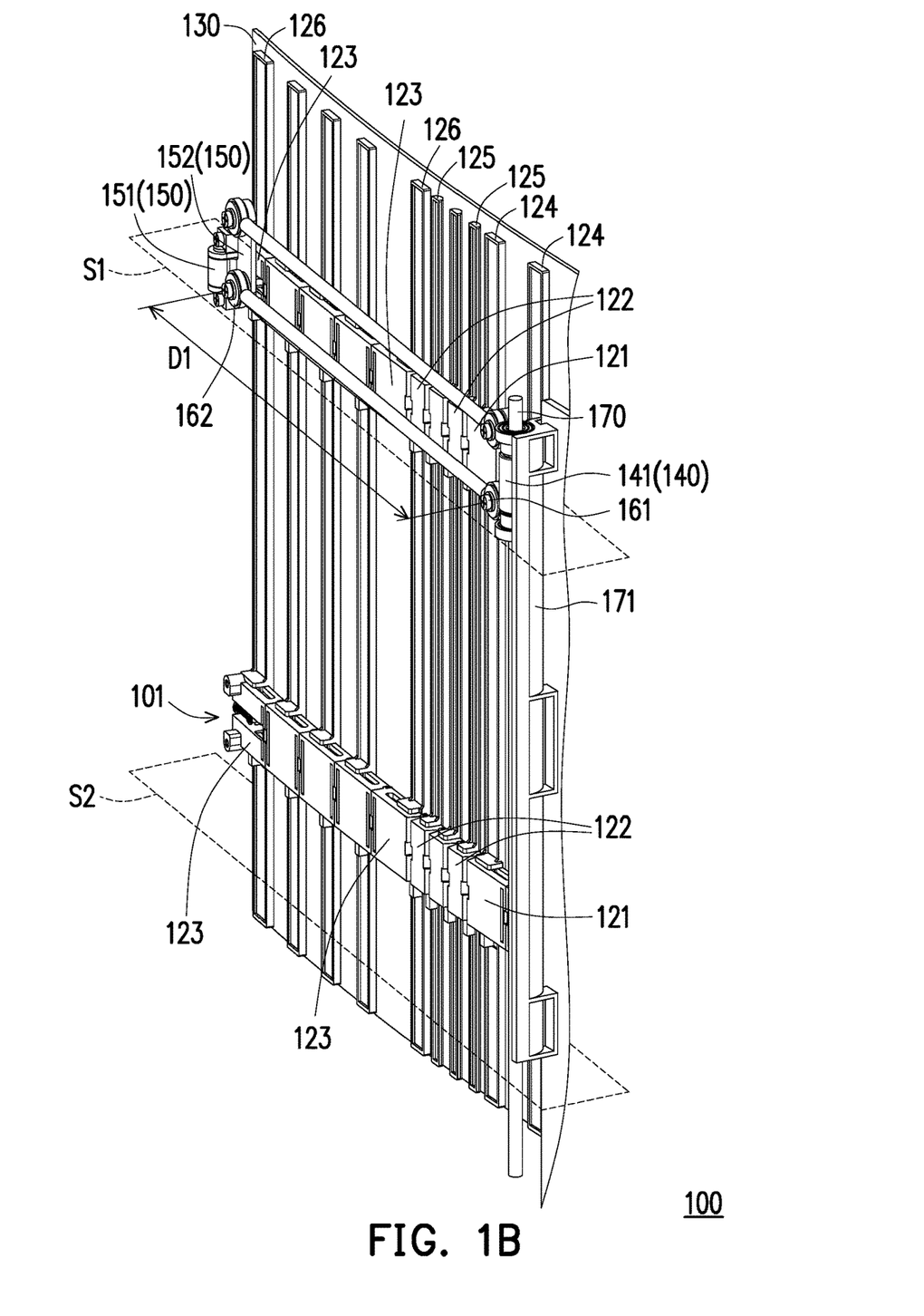
FIG. 1B is a partial three-dimensional schematic view of the flexible display in FIG. 1A.
Figure 2A:
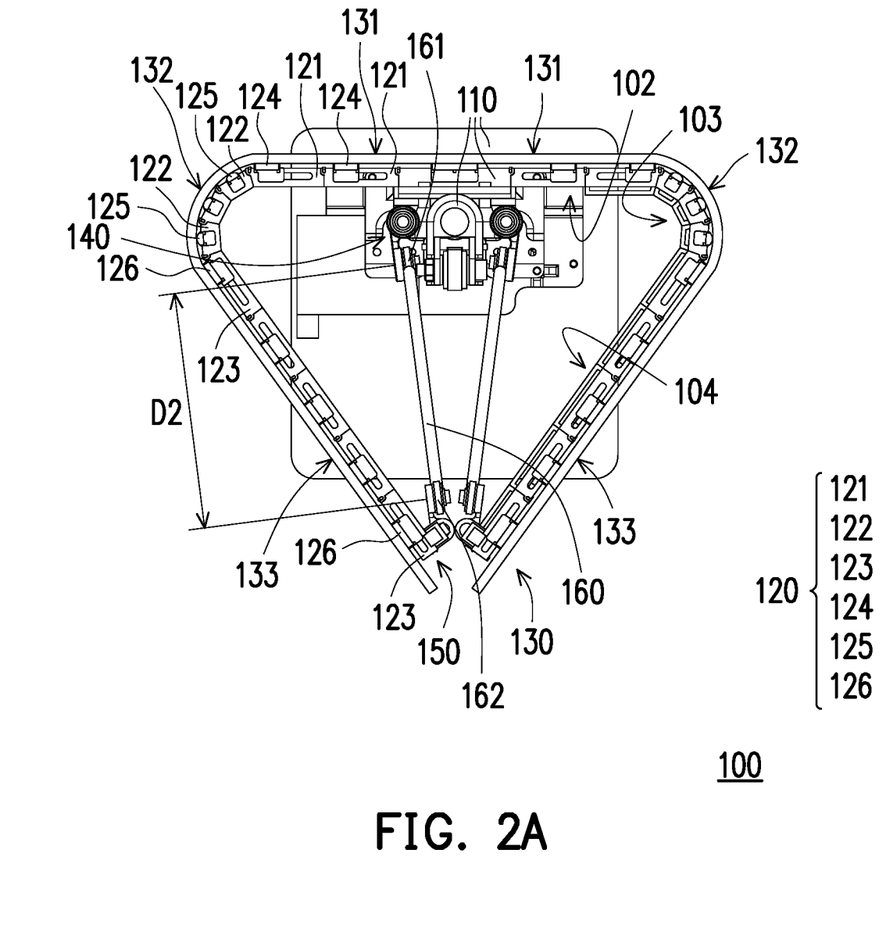
FIG. 2A is a schematic top view of the flexible display in a second mode according to an embodiment of the disclosure.
Figure 2B:
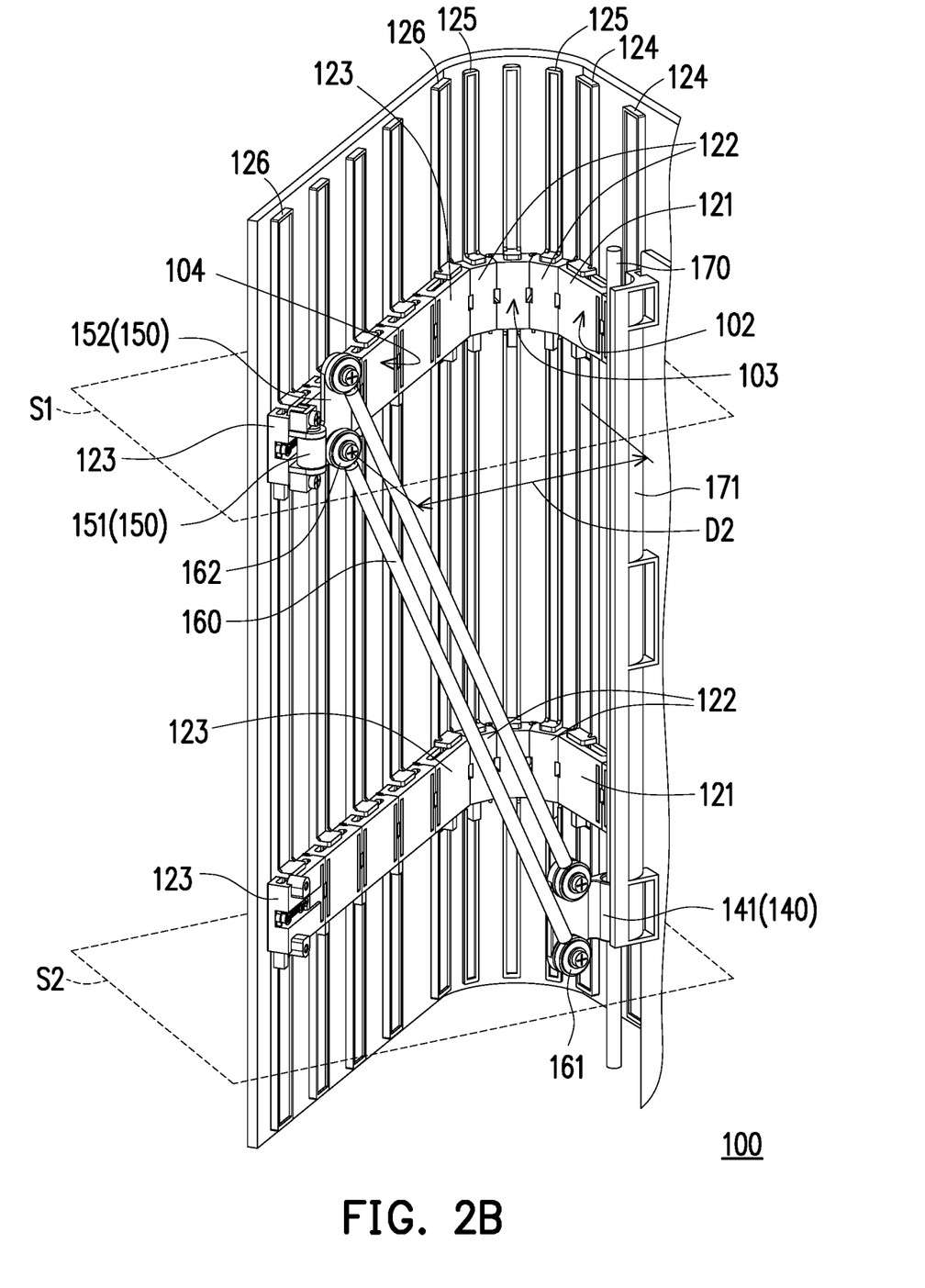
FIG. 2B is a partial three-dimensional schematic view of the flexible display in FIG. 2A.

FIG. 1A is a schematic top view of a flexible display in a first mode according to an embodiment of the disclosure. FIG. 1B is a partial three-dimensional schematic view of the flexible display in FIG. 1A. FIG. 2A is a schematic top view of the flexible display in a second mode according to an embodiment of the disclosure. FIG. 2B is a partial three-dimensional schematic view of the flexible display in FIG. 2A. With reference to FIGS. 1A and 2A, in the embodiment, a flexible display 100 includes a stand 110, a supporting mechanism 120, a flexible screen 130, a driving component 140, a driven component 150, and a link 160. The number of the supporting mechanism 120 may be two, and they are symmetrically disposed on both sides of the stand 110.

For example, one of the two supporting mechanisms 120 is connected to a left side of the stand 110, and the other of the two supporting mechanisms 120 is connected to a right side of the stand 110. Motions of the two supporting mechanisms 120 are synchronized and symmetrical. The flexible screen 130 is attached to the two supporting mechanisms 120, and the flexible screen 130 transforms correspondingly along with the motions of the two supporting mechanisms 120. On the other hand, the stand 110 includes a standing base between the two supporting mechanisms 120. A part of the flexible screen 130 is attached to the standing base, one of the two supporting mechanisms 120 is connected to a left side of the standing base, and the other of the two supporting mechanisms 120 is connected to a right side of the standing base.

The flexible display 100 is suitable for switching between the first mode shown in FIG. 1A and the second mode shown in FIG. 2A. The first mode is a curved surface display mode, and the second mode is a multi-faceted display mode.

As shown in FIG. 1A, in the first mode, every supporting mechanism 120 fits to form a concave arc structure 101. The two concave arc structures 101 of the two supporting mechanisms 120 are continuously connected, and the flexible screen 130 coordinates with the two concave arc structures 101 to form a curved screen 130a to provide a single-sided display and surround view.

As shown in FIG. 2A, in the second mode, every supporting mechanism 120 fits to form a first flat structure 102, a convex arc structure 103 connected to the first flat structure 102, and a second flat structure 104 connected to the convex arc structure 103, and the flexible screen 130 coordinates with the first flat structure 102, the convex arc structure 103 and the second flat structure 104 of every supporting mechanism 120 to form a first flat screen section 131, a curved screen section 132 and a second flat screen section 133 to provide at least three different orientations of visualization. For example, the screen may be cut based on the first flat screen section 131, the curved screen section 132, and the second flat screen section 133 to display multiple working windows, to display multiple operation interfaces, to open multiple web pages, or to execute multiple application software.

In particular, the flexible display 100 may also switch to a transition mode between the first mode and the second mode, and every supporting mechanism 120 may fit to form a flat structure. The two flat structures of the two supporting mechanisms 120 are continuously connected, and the flexible screen 130 coordinates with the two flat structures to form a flat screen, so as to provide the single-sided display. Therefore, the flexible display 100 has excellent operational flexibility.

Figure 3A:
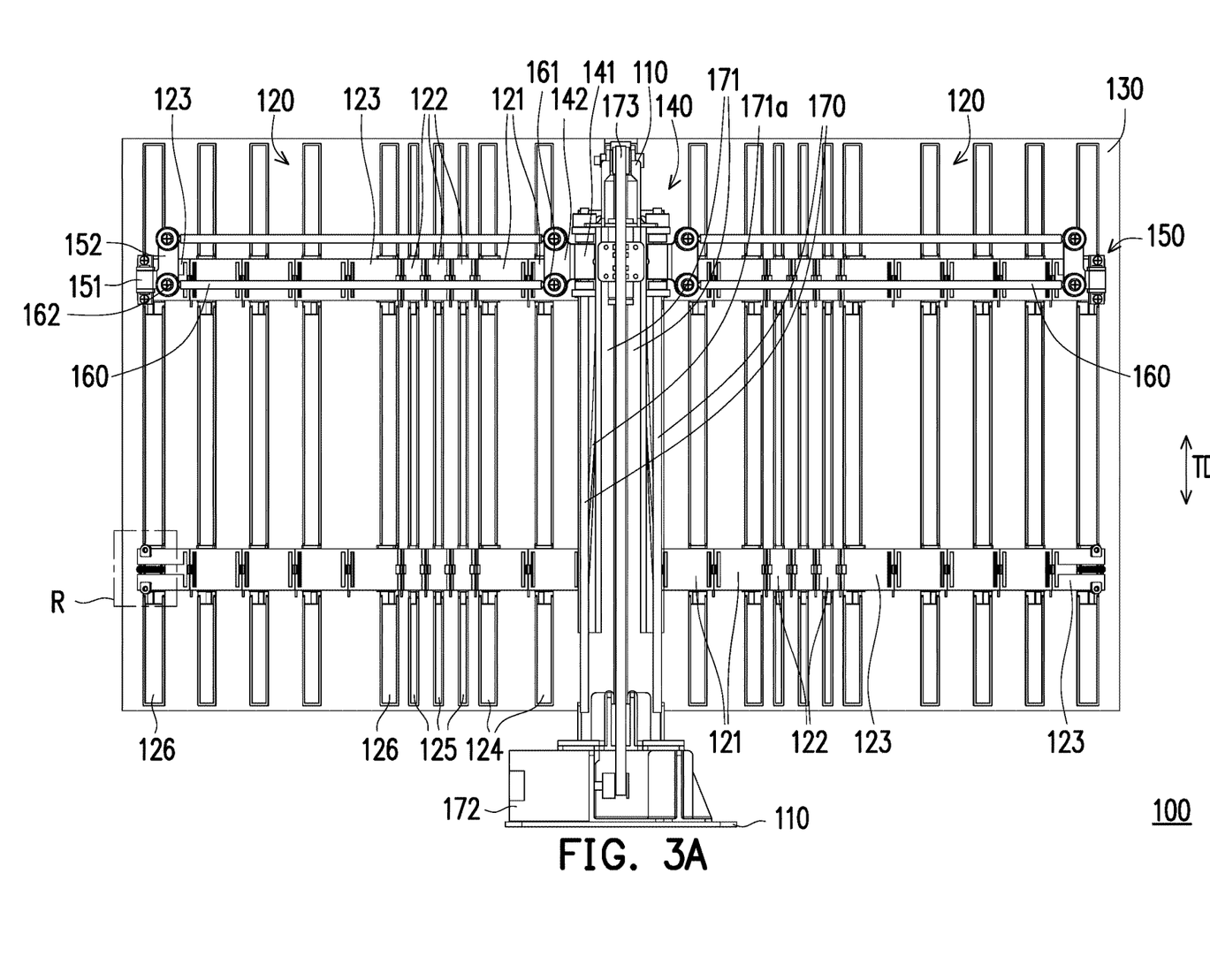
FIG. 3A is a schematic rear view of the flexible display in FIG. 1A.
Figure 3B:
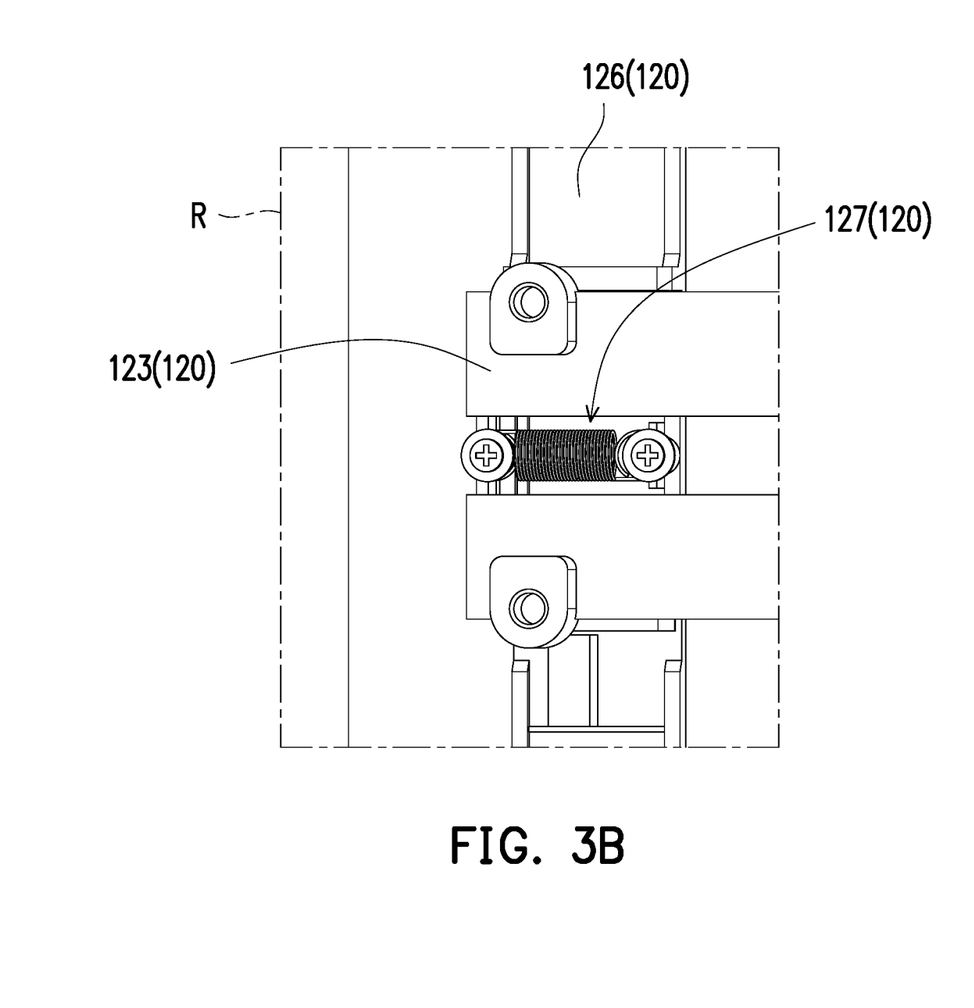
FIG. 3B is an enlarged schematic view of an area R in FIG. 3A.

FIG. 3A is a schematic rear view of the flexible display in FIG. 1A. FIG. 3B is an enlarged schematic view of an area R in FIG. 3A. With reference to FIGS. 1B, 2B and 3A, in the embodiment, both the left and right sides of the stand 110 are disposed with the driving component 140, the driven component 150, and the link 160, which are configured to drive the two supporting mechanisms 120. Furthermore, the driving component 140, the driven component 150, and the link 160 located on the left side of the stand 110 are symmetrical to the driving component 140, the driven component 150, and the link 160 located on the right side of the stand 110 to ensure that the motions of the two supporting mechanisms 120 are synchronized and symmetrical.

Using the supporting mechanism 120, the driving component 140, the driven component 150, and the link 160 located on any side (the left side or the right side) of the stand 110 as an illustration, the driving component 140 is disposed on the stand 110 and is configured to move reciprocatively between a first horizontal plane S1 and a second horizontal plane S2. Or in other words, the driving component 140 moves reciprocatively between a first height and a second height lower than the first height.

Furthermore, there is a height difference between the first horizontal plane S1 and the second horizontal plane S2. A moving direction of the driving component 140 is perpendicular to the first horizontal plane S1, and the first horizontal plane S1 is parallel to the second horizontal plane S2. On the other hand, the driven component 150 is disposed on a side of the supporting mechanism 120 distant from the stand 110, and is connected to the driving component 140 through the link 160. The link 160 has a first end 161 and a second end 162 opposite to the first end 161. The first end 161 is rotatably connected to the driving component 140, and the second end 162 is rotatably connected to the driven component 150.

The first end 161 of the link 160 moves along with the driving component 140 from the first horizontal plane S1 to the second horizontal plane S2 and rotates relative to the driving component 140 when the driving component 140 moves from the first horizontal plane S1 to the second horizontal plane S2. At the same time, the second end 162 of the link 160 rotates relative to the driven component 150, and the driving component 140 drives the driven component 150 through the second end 162 of the link 160 to move on the first horizontal plane S1 to drive the supporting mechanism 120 and the flexible screen 130 to transform. That is to say, positions of the second end 162 of the link 160 and the driven component 150 do not have a change in height when the second end 162 of the link 160 and the driven component 150 are in the process of moving.

The driving component 140 rotates around a rotational axis that is perpendicular to the first horizontal plane S1, and the first end 161 of the link 160 rotates along with the driving component 140 when the driving component 140 moves from the first horizontal plane S1 to the second horizontal plane S2. At the same time, the second end 162 of the link 160 rotates relative to the driven component 150, and the driving component 140 drives the driven component 150 through the second end 162 of the link 160 to move on the first horizontal plane S1 to drive the supporting mechanism 120 and the flexible screen 130 to transform, as shown in FIGS. 2A and 2B.

As shown in FIGS. 1A and 1B, a shortest distance between the orthographic projection of the first end 161 of the link 160 on the first horizontal plane S1 and the orthographic projection of the second end 162 of the link 160 on the first horizontal plane S1 is D1 when the driving component 140 and the driven component 150 are located on the first horizontal plane S1. As shown in FIGS. 2A and 2B, a shortest distance between the orthographic projection of the first end 161 of the link 160 on the first horizontal plane S1 and the orthographic projection of the second end 162 of the link 160 on the first horizontal plane S1 is gradually reduced to D2 when the driving component 140 moves from the first horizontal plane S1 to the second horizontal plane S2. The supporting mechanism 120 generates a corresponding degree of folding based on the aforementioned stroke difference, and the flexible screen 130 coordinates with the supporting mechanism 120 to transform to a corresponding degree.

With reference to FIGS. 1B, 2B, and 3A, in the embodiment, the flexible display 100 further includes a sliding rod 170 and a guiding component 171. The sliding rod 170 and the guiding component 171 are disposed on the stand 110, and the guiding component 171 abuts against the sliding rod 170. Furthermore, both the left and right sides of the stand 110 are disposed with the sliding rod 170 and the guiding component 171. The sliding rod 170 and the guiding component 171 located on the left side of the stand 110 are symmetrical to the sliding rod 170 and the guiding component 171 located on the right side of the stand 110 to ensure that the motions of the two supporting mechanisms 120 are synchronized and symmetrical.

For example, the stand 110 further includes a base. The stand 110 is disposed on the base and connected to the base. On the other hand, the sliding rod 170 and the guiding component 171 are disposed above the base and connected to the stand.

Using the sliding rod 170 and the guiding component 171 located on any side (the left side or the right side) of the stand 110 as an illustration, the sliding rod 170 and the guiding component 171 may determine a sliding direction, a sliding stroke, a rotational direction and a rotational stroke of the driving component 140. In detail, the driving component 140 includes a driving sleeve 141 and a driving pivoting base 142 connected to the driving sleeve 141, and the driving pivoting base 142 moves in synchronization along with the driving sleeve 141. The driving sleeve 141 is slidably sleeved on the sliding rod 170. An extending direction of the sliding rod 170 determines a sliding direction of the driving sleeve 141, and the extending direction of the sliding rod 170 is substantially perpendicular to the first horizontal plane S1 and the second horizontal plane S2. On the other hand, the driving sleeve 141 may rotate relative to the sliding rod 170. A rotational axis of the driving sleeve 141 extends through the sliding rod 170 and is perpendicular to the first horizontal plane S1 and the second horizontal plane S2.

In the embodiment, the guiding component 171 has a spiral sliding rail 171a, and the driving sleeve 141 is mechanically coupled to the spiral sliding rail 171a. For example, the spiral sliding rail 171a is a spiral sliding groove on the guiding component 171. An outer wall surface of the driving sleeve 141 is disposed with a guiding protrusion, and the guiding protrusion is slidably disposed in the spiral sliding groove. The driving sleeve 141 also slides relative to the guiding component 171 and the guide protrusion slides in the spiral sliding groove when the driving sleeve 141 slides on the sliding rod 170. The driving component 140 generates a corresponding degree of rotation during the process of the driving component 140 sliding relative to the sliding rod 170, based on a path change of the spiral sliding rail 171a.

On the other hand, the first end 161 of the link 160 is pivotally connected to the driving pivoting base 142. A rotational axis of the first end 161 of the link 160 is perpendicular to the rotational axis of the driving sleeve 141. The driving pivoting base 142 and the first end 161 of the link 160 slide and rotate in synchronization along with the sliding and the rotation of the driving sleeve 141.

With reference to FIG. 3A, in the embodiment, the flexible display 100 further includes a motor 172 disposed on the stand 110 and a belt 173 mechanically coupled to the motor 172. The motor 172 may be a servo motor or a stepping motor, and an output shaft of the motor 172 is mechanically coupled to the belt 173 to drive the belt 173 to rotate forward or reverse. On the other hand, the belt 173 is mechanically coupled to the driving sleeve 141 on the left side of stand 110 and the driving sleeve 141 on the right side of stand 110. Therefore, a combination of the motor 172 and the belt 173 may be configured to drive the driving component 140, the link 160, the driven component 150, and the supporting mechanism 120 located on the left side of the stand 110, and to drive the driving component 140, the link 160, the driven component 150, and the supporting mechanism 120 located on the right side of the stand 110 in synchronization. A driving direction TD of the belt 173 is parallel to the sliding rod 170 to drive the driving component 140 to slide along the extending direction of the sliding rod 170.

Since the combination of the motor 172 and the belt 173 may provide a driving force for folding the supporting mechanism 120 and the flexible screen 130, a step of manually folding the supporting mechanism 120 and the flexible screen 130 by a user is eliminated, and operational convenience is improved accordingly.

For example, the motor 172 is installed on the base of the stand 110, and the belt 173 is disposed corresponding to the standing base of the stand 110.

Using the supporting mechanism 120, the driving component 140, the driven component 150, and the link 160 located on any side (the left side or the right side) of the stand 110 as an illustration, with reference to FIGS. 1B, 2B and 3A, the driven component 150 includes a driven pivot 151 and a driven pivoting base 152, and the driven pivot 151 is disposed on the side of the supporting mechanism 120 distant from the stand 110. On the other hand, the driven pivoting base 152 is pivotally connected to the driven pivot 151, and the second end 162 of the link 160 is pivotally connected to the driven pivoting base 152. In detail, a rotational axis of the driven pivoting base 152 is perpendicular to the first horizontal plane S1 and perpendicular to a rotational axis of the second end 162 of the link 160.

The driven component 150 moves on the first horizontal plane S1, and a horizontal distance between the driven component 150 and the stand 110 increases or decreases when the driving component 140 drives the driven component 150 through the link 160. The supporting mechanism 120 unfolds or folds under the influence of the driven component 150 to enable the flexible screen 130 to transform to a corresponding degree.

Using the supporting mechanism 120, the driving component 140, the driven component 150, and the link 160 located on any side (the left side or the right side) of the stand 110 as an illustration, with reference to FIGS. 1A, 2A, and 3A, the supporting mechanism 120 includes multiple first hinge blocks 121 rotatably connected to each other, multiple second hinge blocks 122 rotatably connected to each other, multiple third hinge blocks 123 rotatably connected to each other, multiple first supporting rods 124, multiple second supporting rods 125 and multiple third supporting rods 126.

Any two adjacent first hinge blocks 121 are pivotally connected to each other, and a rotational axis is perpendicular to the first horizontal plane S1. In addition, the multiple first hinge blocks 121 are arranged in two upper and lower rows to improve support for the flexible screen 130. Any two adjacent second hinge blocks 122 are pivotally connected to each other, and a rotational axis is perpendicular to the first horizontal plane S1. In addition, the multiple second hinge blocks 122 are arranged in two upper and lower rows to improve the support for the flexible screen 130. Any two adjacent third hinge blocks 123 are pivotally connected to each other, and a rotational axis is perpendicular to the first horizontal plane S1. In addition, the multiple third hinge blocks 123 are arranged in two upper and lower rows to improve the support for the flexible screen 130.

One of the multiple first hinge blocks 121 distant from the multiple second hinge blocks 122 is rotatably connected to the stand 110, and a rotational axis is perpendicular to the first horizontal plane S1. The multiple first hinge blocks 121 are located between the stand 110 and the multiple second hinge blocks 122, and one of the multiple first hinge blocks 121 distant from the stand 110 is rotatably connected to one of the multiple second hinge blocks 122 closest to the stand 110, and a rotational axis is perpendicular to the first horizontal plane S1.

The multiple second hinge blocks 122 are located between the multiple first hinge blocks 121 and the multiple third hinge blocks 123, and one of the multiple second hinge blocks 122 distant from the multiple first hinge blocks 121 is rotatably connected to one of the multiple third hinge blocks 123 closest to the multiple first hinge blocks 121, and a rotational axis is perpendicular to the first horizontal plane S1. For example, a torsion spring is disposed between any two of the hinge blocks that are pivotally connected to each other to provide a restoring force required by the supporting mechanism 120.

The multiple first supporting rods 124 are slidably disposed on the multiple first hinge blocks 121, and every first supporting rod 124 is disposed corresponding to a first hinge block 121 in the upper row and a first hinge block 121 in the lower row. The multiple second supporting rods 125 are fixed on the multiple second hinge blocks 122, and every second supporting rod 125 is disposed corresponding to a second hinge block 122 in the upper row and a second hinge block 122 in the lower row. The multiple third supporting rods 126 are slidably disposed on the multiple third hinge blocks 123, and every third supporting rod 126 is disposed corresponding to a third hinge block 123 in the upper row and a third hinge block 123 in the lower row.

With reference to FIGS. 1A, 2A and 3A, the flexible screen 130 is attached to the multiple first supporting rods 124, the multiple second supporting rods 125, and the multiple third supporting rods 126, and the driven component 150 is disposed on one of the multiple third hinge blocks 123 distant from the stand 110. Since the multiple first supporting rods 124 and the multiple third supporting rods 126 have a degree of freedom of sliding motion, a degree of tension of the flexible screen 130 during the folding process may be adaptively adjusted by the multiple first supporting rods 124 and the multiple third supporting rods 126 to prevent the flexible screen 130 from being damaged due to being too tight.

As shown in FIG. 1A, in the first mode, the multiple first hinge blocks 121, the multiple second hinge blocks 122, and the multiple third hinge blocks 123 of every supporting mechanism 120 fit to form the concave arc structure 101. The two concave arc structures 101 of the two supporting mechanisms 120 are continuously connected, and the flexible screen 130 coordinates with the two concave-arc structures 101 to form the curved screen 130a to provide the single-sided display and surround view.

As shown in FIG. 2A, in the second mode, the multiple first hinge blocks 121 of every supporting mechanism 120 fit to form the first flat structure 102, the multiple second hinge blocks 122 fit to form the convex arc structure 103 connected to the first flat structure 102, and the multiple third hinge blocks 123 fit to form the second flat structure 104 connected to the convex arc structure 103. The flexible screen 130 coordinates with the first flat structure 102, the convex arc structure 103 and the second flat structure 104 of every supporting mechanism 120 to form the first flat screen section 131, the curved screen section 132, and the second flat screen section 133 to provide the at least three different orientations of visualization. For example, the screen may be cut based on the first flat screen section 131, the curved screen section 132, and the second flat screen section 133 to display the multiple working windows, to display the multiple operation interfaces, to open the multiple web pages, or to execute the multiple application software.

In particular, compared to the multiple first hinge blocks 121 and the multiple third hinge blocks 123, the multiple second hinge blocks 122 have the largest folding amplitude.

With reference to FIGS. 3A and 3B, in the embodiment, every supporting mechanism 120 further includes a spring 127, and two ends of the spring 127 are respectively connected to the one of the multiple third hinge blocks 123 distant from the stand 110 and the third supporting rod 126 disposed on the one of the multiple third hinge blocks 123 distant from the stand 110. For example, the spring 127 may be a compressed spring. In the first mode, the third supporting rod 126 is at a dead center of an outer stroke on the third hinge block 123, and the spring 127 is compressed. During the transition from the first mode to the second mode, an elastic force of the spring 127 pushes the third supporting rod 126 to move away from the dead center of the outer stroke. Therefore, the spring 127 may be used to assist in adjusting the degree of tension of the flexible screen 130.

In an embodiment, the numbers of the first hinge block 121, the third hinge block 123, the first supporting rod 124, and the third supporting rod 126 are respectively one. The first hinge block 121 is located between the stand 110 and the multiple second hinge blocks 122. The two ends of the first hinge block 121 are respectively rotatably connected to the stand 110 and one of the second hinge blocks 122, and the driven component 150 is disposed on an end of the third hinge block 123 distant from the stand 110. In addition, the two ends of the spring 127 are respectively connected to the third hinge block 123 and the third supporting rod 126.

In another embodiment, the numbers of the first hinge block 121 and the third hinge block 123 are respectively one, and the numbers of the first supporting rod 124 and the third supporting rod 126 are respectively more than one. For example, the multiple first supporting rods 124 are slidably connected to a same first hinge block 121, and the multiple third supporting rods 126 are slidably connected to a same third hinge block 123.

In summary, in the flexible display of the disclosure, in the flexible display of the disclosure, the driven component is driven by the link and moves on the same horizontal plane by the reciprocating movement of the driving component between the two different horizontal planes, so as to drive the supporting mechanism and the flexible screen attached on the supporting mechanism to transform correspondingly. In one of the modes, the flexible screen coordinates with the supporting mechanism to form the curved screen to provide the single-sided display and surround view. In another mode, the flexible screen coordinates with the structural form of the supporting mechanism to form the first flat screen section, the curved screen section, and the second flat screen section, so as to provide the at least three different orientations of visualization. In other words, the flexible display of the disclosure can meet the requirements of universal bending. In addition, the combination of the motor and the belt can provide the driving force to fold the supporting mechanism and the flexible screen, eliminating the need for the user to manually fold the supporting mechanism and the flexible screen, thereby improving operational convenience.

Although the disclosure has been disclosed with the foregoing exemplary embodiments, it is not intended to limit the disclosure. Any person skilled in the art can make various changes and modifications within the spirit and scope of the disclosure. Accordingly, the scope of the disclosure is defined by the claims appended hereto and their equivalents.

What is claimed is:

1. A flexible display, comprising:
   a stand;
   a supporting mechanism, connected to the stand;
   a flexible screen, attached to the supporting mechanism;
   a driving component, disposed on the stand, and configured to move between a first horizontal plane and a second horizontal plane, and the first horizontal plane is parallel to the second horizontal plane;
   a driven component, disposed on a side of the supporting mechanism distant from the stand; and
   a link, having a first end and a second end opposite to the first end, wherein the first end is connected to the driving component and the second end is connected to the driven component,
   wherein the driving component drives the driven component through the link to move on the first horizontal plane to drive the supporting mechanism and the flexible screen to transform when the driving component moves between the first horizontal plane and the second horizontal plane.

2. The flexible display according to claim 1, wherein there is a height difference between the first horizontal plane and the second horizontal plane, and a moving direction of the driving component is perpendicular to the first horizontal plane.

3. The flexible display according to claim 1, wherein the supporting mechanism comprises:
   at least one first hinge block, and the first hinge block is rotatably connected to the stand;
   a plurality of second hinge blocks that are rotatably connected to each other, wherein the first hinge block is located between the stand and the second hinge blocks, and one of the second hinge blocks is rotatably connected to the first hinge block;
   at least one third hinge block, wherein the second hinge blocks are located between the first hinge block and the third hinge block, and the third hinge block is rotatably connected to another of the second hinge blocks;
   at least one first supporting rod that is slidably disposed on the first hinge block;
   a plurality of second supporting rods that are fixed on the second hinge blocks; and
   at least one third supporting rod that is slidably disposed on the third hinge block, wherein the flexible screen is attached to the first supporting rod, the second supporting rods, and the third supporting rod, and the driven component is disposed on an end of the third hinge block distant from the stand.

4. The flexible display according to claim 3, wherein the first hinge block, the second hinge blocks, and the third hinge block fit to form a concave arc structure, and the flexible screen coordinates with the concave arc structure to form a curved screen.

5. The flexible display according to claim 3, wherein the first hinge block fits to form a first flat structure, the second hinge blocks fit to form a convex arc structure, and the third hinge block fits to form a second flat structure, and the flexible screen coordinates with the first flat structure, the convex arc structure and the second flat structure to form a first flat screen section, a curved screen section, and a second flat screen section.

6. The flexible display according to claim 3, wherein the supporting mechanism further comprises a spring, and two ends of the spring are respectively connected to the third hinge block and the third supporting rod.

7. The flexible display according to claim 3, wherein a number of the first hinge block is more than one, and a number of the third hinge block is more than one, the first hinge blocks are rotatably connected to each other, one of the first hinge blocks is rotatably connected to the stand, and another of the first hinge blocks is rotatably connected to one of the second hinge blocks, and the third hinge blocks are rotatably connected to each other, one of the third hinge blocks is rotatably connected to another of the second hinge blocks, and the driven component is disposed on one of the third hinge blocks distant from the stand.

8. The flexible display according to claim 7, wherein a number of the first supporting rods is more than one, and a number of the third supporting rods is more than one, the first supporting rods are slidably disposed on the first hinge blocks, and the third supporting rods are slidably disposed on the third hinge blocks.

9. The flexible display according to claim 8, wherein the supporting mechanism further comprises a spring, and two ends of the spring are respectively connected to the one of the third hinge blocks distant from the stand and the third supporting rod disposed on the one of the third hinge blocks distant from the stand.

10. The flexible display according to claim 1, further comprising a sliding rod disposed on the stand, wherein the driving component comprises a driving sleeve and a driving pivoting base connected to the driving sleeve, the driving sleeve is slidably sleeved on the sliding rod, and the first end of the link is pivotally connected to the driving pivoting base.

11. The flexible display according to claim 10, further comprising a guiding component disposed on the stand and abutting against the sliding rod, wherein the guiding component has a spiral sliding rail, and the driving sleeve is mechanically coupled to the spiral sliding rail.

12. The flexible display according to claim 10, further comprising a motor disposed on the stand and a belt mechanically coupled to the motor, wherein the belt is mechanically coupled to the driving sleeve, and a transmission direction of the belt is parallel to the sliding rod.

13. The flexible display according to claim 1, wherein the driven component comprises a driven pivot and a driven pivoting base, the driven pivot is disposed on the side of the supporting mechanism distant from the stand, the driven pivoting base is pivotally connected to the driven pivot, and the second end of the link is pivotally connected to the driven pivoting base.

* * * * *